March 23, 1943.    T. O. LILLQUIST    2,314,588
GENERATING ELECTRIC DRIVE AND CONTROL SYSTEM
Filed Aug. 17, 1942
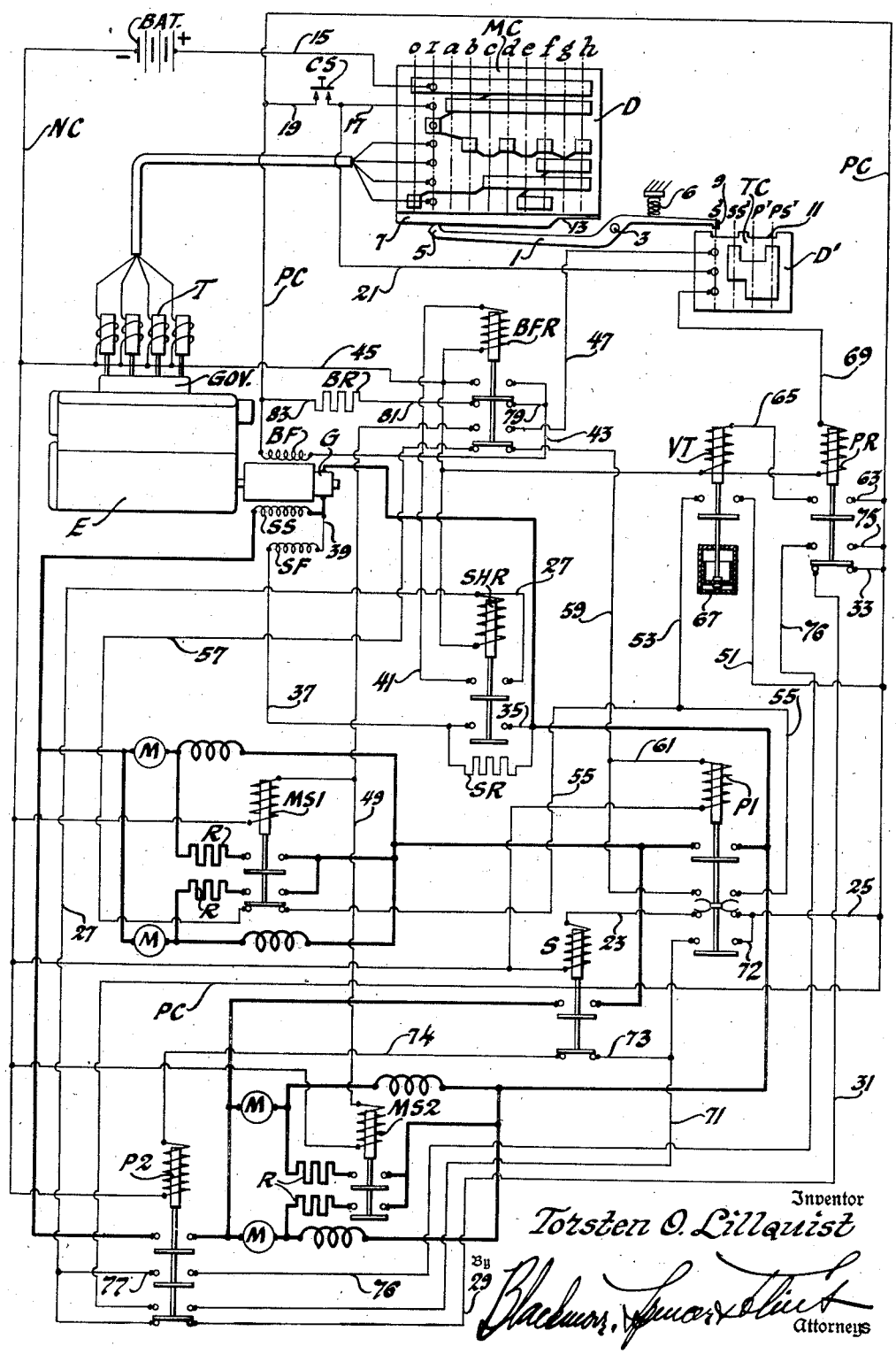
Inventor
Torsten O. Lillquist
By
Blackmore, Spencer & Flint
Attorneys Patented Mar. 23, 1943

2,314,588

UNITED STATES PATENT OFFICE 2,314,588

GENERATING ELECTRIC DRIVE AND CONTROL SYSTEM

Torsten O. Lillquist, Clarendon Hills, Ill., assignor to General Motors Corporation, Detroit, Mich., a corporation of Delaware Application August 17, 1942, Serial No. 455,098

6 Claims. (Cl. 290—17)

The present invention relates generally to generating electric traction systems and more particularly relates to control means included therein for controlling a change in the speed and torque characteristics of said systems from one range to another.

In generating electric traction systems in which a prime mover drives an electrical generator supplying power to traction motors the circuit connections between the generator and motors are transferred to obtain different ranges in the speed and torque characteristics of the combined traction system. The operating characteristics of the prime mover, generator and motors are selected so that the combination will operate together in an efficient manner for the different generator and motor circuit relations but upon a change of circuit relations the operating characteristics of the combined system must be modified during transition of the connections to prevent electrical and mechanical stresses on the system.

The principal object of the present invention is the provision of a control system for a generating electric traction system including control means which are selectively operable for controlling the output of the power generating means and the voltage and current in the generator and motor excitation and power circuits in proper preselected sequence so that closed circuit transition between different power circuit connections is accomplished smoothly by reducing the voltage and current in said power circuits during transition, thereby to prevent any sudden electrical or mechanical stresses being imparted to the combined generating electric traction system.

The combination of means comprising my improved generating electric traction and control system by which the above object is accomplished will be better understood by reference to the following detailed description thereof, and the accompanying drawing illustrating a combination in diagrammatic form which has been found to give highly satisfactory operating characteristics on Diesel electric locomotives.

Referring now to the drawing the generating electric traction system comprises a prime mover shown as a Diesel engine E driving an electric generator G of the compound type, which is shown connected by suitable power circuit connections, shown in heavy lines on the drawing, with a plurality of series type traction motors M which are each operatively connected in any well known manner to individual locomotive driving axles, not shown, having traction wheels fixed thereto.

The control and interlocking electrical connections, shown in lighter lines on the drawing, interconnect engine, generator, motor control means and power circuit connection transferring means connected in the power circuit in a manner which will now be described in detail to accomplish the above mentioned object of the invention.

The power circuit transferring means comprises a plurality of contactors shown at S, P1, and P2 having a plurality of pairs of fixed contacts and contacts fixed on an armature movable into and out of contact with the fixed contacts. These contactors may be electromagnetically actuated or electro-pneumatically actuated, and are shown provided with an electromagnetic actuating winding which when energized causes upward movement of the armatures from the normal position shown, which will be referred to as the open position, as the upper pair of fixed contacts of each are shown connected to power connections, and these contacts are bridged or closed by upward movement of the contactor armatures. With the power connections arranged as shown, pairs of motors M are connected permanently in parallel and upon closure of the contactor S pairs of motors will be connected in series with the generator armature, or in series-parallel relation therewith, and when both of the contactors P1 and P2 close simultaneously the motors will be connected in parallel with the generator armature. The contactor S will be referred to as the series contactor and the contactors P1 and P2 will be referred to as parallel contactors throughout the following description of the system.

Means are provided for shunting the series field windings of each of the motors comprising contactors MS1, MS2 and resistors R. As shown each of these contactors is provided with two pairs of fixed contacts and two armature contacts movable into bridging relation with the fixed contacts. One resistor and one pair of fixed contacts of each of the contactors MS1 and MS2 is shown connected in series and across a series field winding of each motor M. The contactors MS1 and MS2 are each likewise provided with an actuating winding for moving the armature from the normally open position, as shown, to a closed position to connect the individual resistors R in shunt or across each motor series field winding to reduce the motor excitation and decrease the C. E. M. F. thereof. As will be explained later the contactors MS1 and MS2 may be closed for either the series-parallel or parallel motor power circuit connections giving four speed and torque ranges corresponding to the following circuit connections which are: series-parallel, series-parallel with the motor fields shunted, or a series-parallel-shunt connection, parallel, and parallel with the motor fields shunted or a parallel-shunt connection.

During transition of the connections between the series-parallel-shunt motor circuit connection and the parallel connection, or the reverse, means are provided to reduce the power output of the generator to substantially zero and means are also provided to prevent opening of the power circuit and for shunting the motor field windings in proper sequence in order to prevent voltage and current surges in the power circuits thereby preventing electrical torque surges on the motors, generator and prime mover.

The generator output regulating means comprises discharge resistors BR and SR connected in the battery field BF and shunt field SF circuits and electromagnetically actuated relays BFR and SHR having interlocking and control connections with a battery BAT, manually operable control switch CS, master controller MC, and transition controller TC and also with the contactors S, P1, P2, MS1, and MS2 and control relays shown at PR and VT to cause proper operating sequence of the above combination of means.

An engine driven governor GOV is provided having conventional speed setting means, not shown, to vary the speed response thereof and serves in a well known manner to operate the conventional engine fuel control means, not shown, to maintain substantially constant speed, load and output of the engine for each given speed setting of the governor. A plurality of electromagnetically actuated means, shown generally at T, are operatively connected mechanically in any well known manner to the governor speed setting means, and the electromagnetic actuating windings thereof are each shown individually connected by suitable conductors to separate fixed contacts shown on the master controller MC for energization thereby, either separately or in various combinations upon manual movement of the drum D of the controller. The drum D of the master controller is provided with a plurality of contacts shown fixed thereon, which are moved into or out of contact with the fixed controller contacts in various combinations or separately when the drum is moved respectively from the idle or off positions I and O to positions a to h. The contacts on the drum are shown interconnected electrically and are arranged so that the engine is stopped when the drum is moved to the off position O; and when moved to the idle position I the engine runs at idling speed, and when moved from this position to positions a to h the engine speed and output is varied, the position h corresponding to maximum engine speed and output.

The manually operable transition controller TC is shown provided with a movable drum D' on which is fixed a contact capable of being moved to four positions shown at S', SS', P' and PS' to establish respectively series-parallel, series-parallel-shunt, parallel and parallel-shunt motor circuit relations. The series-parallel-shunt and parallel-shunt circuit relations as previously mentioned being respectively the series-parallel and parallel circuit relations of the motors with the motor fields shunted. The contact on the drum D' is formed so that it is movable into contact with two or more of the three fixed contacts shown provided on the transition controller when the controller is moved to positions SS', P' and PS' and out of contact with all the fixed contacts when the controller is in the S' position, as shown. As will be subsequently described, the fixed controller contacts are electrically connected in proper circuit relations with the previously mentioned relays and contactors to cause the motor fields to be shunted when the drum D' is in position SS' or PS' and to cause proper sequence of operation of the relays and contactors in order to properly control the transfer of the motor connections with the generator and to also control the generator output and motor excitation during transfer of the connections upon movement of the transition controller drum between positions SS' and P'.

In order to prevent movement of the transition controller TC when the master controller MC is moved to positions g and h controlling operation of the engine E at high values of speed and output, mechanical interlocking means is provided between the master and transition controllers so that the motor connections can only be transferred between the series-parallel and parallel circuit connections when the engine is operating at lower values of speed and output. This interlocking means comprises a lever 1 pivoted at 3 having an end 5 biased by a spring 6 into contact with a cam 7 on the master controller and a detent 9 on the opposite end of the lever capable of entering detent slots 11 in the transition controller drum D'. The cam 7 is provided with a depression 13 which is adjacent the controller positions g and h which causes the detent end 9 of the lever 1 to enter either of the two slots 11 in the transition controller drum. One of these slots is located adjacent the series-parallel control positions S' and SS', and the other slot is located adjacent the parallel control positions P' and PS' to prevent movement of the drum between the series-parallel and parallel positions when the engine E is operated at high values of speed and output.

The detailed description of the various contactors relays and the electrical control and interlocking connections between the controllers, and battery BAT will now be described in detail.

The negative terminal of the battery is shown connected to a negative control conductor NC and a plurality of branch conductors are connected thereto which are connected to each of the lower terminals of the actuating windings of each of the above mentioned electromagnetic means T operating the speed setting means for the engine governor GOV and also to each of the lower winding terminals of the relay and contactor actuating windings. The positive battery terminal is connected to the upper fixed contact of the master controller MC by a conductor 15 and the controller fixed contact second from the top is connected by a conductor 17 to one contact of the control switch CS whose other contact is connected by a conductor 19 to a positive control conductor PC. A branch conductor 21 is shown connected between the conductor 17 and the central fixed contact of the transition controller TC and a plurality of branch conductors are shown connected between the positive control conductor PC and the various relays and contactors to control energization and operation thereof in proper sequence.

The various control circuit connections and the sequence of operation of the relays and contactors upon operation of the manually operable master controller and transition controller TC will be described starting with the various control means in the normal position shown.

With the master controller in the idle position I movement thereof to any position between $a$ and $e$ cause the electromagnetic means T to be energized in various combinations to cause the engine E to operate at the lower values of speed and output and causes energization of the generator battery field BF and shunt field windings and the winding of the series contactor S to be energized in the following manner. The upper terminal of the series contact winding is shown connected by a conductor 23 to one contact of the pair of fixed contacts second from the bottom of the parallel contactor P1, shown bridged and the other contact of this pair of contacts is connected by a conductor 25 directly to the positive control conductor PC which is connected to the positive terminal of the battery BAT when the master controller is moved to any position between $a$ and $h$ so that the winding of the series contactor is then connected across the battery which causes the armature to be attracted and move upward to the closed position to bridge the upper pair of the fixed contacts thereof. Closure of the upper pair of contacts accordingly connects the motors in series-parallel circuit relation with the armature of the generator G. The upper right hand fixed contact and upper winding terminal of relay SHR are shown connected in series with the lower pair of fixed contacts of both the parallel contactor P2 and the relay PR to the positive control conductor PC by means of conductors 27, 29, 31 and 33 and as these fixed contacts are shown bridged the winding of relay SHR will be energized to attract and move the armature contacts thereof upward into bridging relation with both pairs of fixed contacts. The bridging of the lower pair of fixed contacts of the relay SHR shunts the discharge resistor SR, shown connected across these contacts which are connected in series with the generator shunt field winding SF to connect the generator shunt field winding SF across the generator armature through conductors 35, 37 and 39, comprising the generator shunt field circuit connections. Bridging of the upper pair of fixed contacts of the relay SHR, shown connected in series with the upper winding terminal of the relay BFR by conductors 27 and 41, energizes this winding and causes the armature contacts thereof to move upward so that both the upper pair of fixed contacts and the pair next to the bottom are bridged. The bridging of the upper pair of contacts completes the circuit from the positive conductor PC, shown directly connected to the battery field BF, to the negative control conductor through conductors 43 and 45 shown connected to these upper fixed relay contacts. Bridging of the fixed contacts of relay BFR second from the bottom, shown connected in series by conductors 47 and 49 between the upper fixed contact of the transition controller and each of the upper winding terminals of the motor shunting contactors MS1 and MS2, sets up a connection thereto for subsequent energization through the contacts of the transition controller when it is subsequently moved to the position SS' to cause the motor series fields to be shunted by the resistors R when the motors are connected in series-parallel-shunt circuit relation.

In order to change from the series-parallel to the series-parallel-shunt connection it is necessary to move the transition controller TC from the series-parallel position S' to the series-parallel-shunt position SS'. This causes the windings of the shunting contactors MS1 and MS2 to be energized through connections 47 and 49, previously described, which causes closure of the contacts thereof, thereby connecting the shunting resistors R in shunt relation with the motor series field windings. With the motor fields shunted the C. E. M. F. of the motors is reduced and the current supplied to the motors by the generator is increased to cause an increase in the speed and torque of the motor.

It will be noted that the shunting contactor MS1 is provided with an additional pair of fixed lower contacts, serving as interlocking contacts which are bridged only when this contactor is in the open position, as shown. These interlocking contacts are shown connected in an interlocking control circuit which includes the fixed pair of contacts of the relay VT, the lower pair of fixed contacts of the contactor MS1 mentioned and the lower pair of fixed contacts of the relay BFR and conductors 51, 53, 55, 57, 59 and 61. It will be noted that the conductor 51 is connected to the positive control conductor PC and that the conductor 61 connects the upper winding terminal of the contactor P1 with the conductor 59 which is connected to one fixed contact third from the bottom of the contactor P1 and the other fixed contact third from the bottom of contactor P1 is connected to the conductor 55.

The upper winding terminal of the relay VT is shown connected in series with the upper pair of fixed contacts of the relay PR to the positive control conductor PC by conductors 63 and 65, the former conductor being connected to the positive control conductor PC and the latter conductor being connected to the winding of the relay VT. The above connections serve to control energization of the relay VT and subsequent energization of the parallel contactor P1 to establish the parallel motor circuit. The relay VT is provided with any type of delaying means, to delay closing and opening movement of the contacts of the relay VT, the above means being shown schematically as a piston and dashpot mechanism indicated generally at 67, and the relay VT will subsequently be referred to as a time delay relay.

The relay PR controls energization of both the time delay relay VT and parallel relay P1. Energization of the relay PR which will be subsequently referred to as the parallel control relay takes place when the transition controller is moved to the parallel position P' as the central and lower fixed controller contacts are then bridged and the latter contact is connected by a conductor 69 to the upper winding terminal of the parallel control relay PR.

In order to insure proper sequence of operation of the relays BFR and SHR controlling the output of the generator in combination with the contactors MS1, MS2, S, P1, and P2 and to prevent opening of the motor circuit connections upon transfer of the connections the following interlocking and control circuit connections are provided. These connections include the pair of fixed contacts second from the bottom on the parallel contactor P2 and the bottom pair of fixed contacts of the parallel contactor P1 which are shown connected in series between the positive control conductor PC and the conductor 25 by conductors 71 and 72 and also a connection including the lower fixed contacts of the series contactor S shown connected in series between the conductor 71 and the upper winding terminal of the parallel contactor P2 by conductors 73 and 74 and also a connection comprising conductors 75, 76 and 77 connecting the central pair of fixed contacts of the relay PR and the fixed contacts second from the top of contactor P2 in series between the positive control conductor PC and conductor 27.

With the above described control interlocking and power connections, assuming that the motors are operated in the series-parallel-shunt circuit relation, as described above, forward transition from this circuit relation to the straight parallel motor circuit relation takes place in a sequence to be described upon movement of the transition controller from the series-parallel-shunt position SS' to the parallel position P'. As previously mentioned, due to the mechanical interlock between the master controller MC and the transition controller TC movement of the latter can only take place when the engine power is reduced, that is when the master controller is in any position between I and f.

Forward transition; that is, from the above described series-parallel-shunt motor connection, to the straight parallel motor connection is accomplished through the following interlocking and control connections to cause the following sequence of operation of the above relays and contactors when the transition controller is moved from the SS' position to the parallel position P'. Initial movement of the movable controller contact from position SS' toward position P' breaks the connection between the upper fixed contact from the central fixed contact of the controller TC to break the previously described energization circuit to the shunting contactors MS1 and MS2 which causes a rise in the motor C. E. M. F. to reduce the generator current supplied to the motors by the connection of the shunting resistors R across the motor field windings and upon completion of the movement of the movable contact to position P' the central and lower fixed contacts of the transition controller are bridged. As previously stated the lower fixed controller contact is connected by a conductor 69 to the upper winding terminal of the relay PR and this winding is therefore connected to the positive control conductor PC through conductors 15, 17, 21 and 69 and is energized to cause upward movement of the relay contacts into bridging relation with the upper and central fixed contacts of the relay, the lower pair of fixed contacts then being opened. When the lower pair of relay contacts open the previously described energizing circuit to the winding of the relay SHR is broken and its armature drops to the normal position as shown inserting the discharge resistor SR in series with the generator shunt field winding by the opening of the lower contacts of the relay SHR. Opening of the upper contacts of the relay SHR disconnects the energizing circuit to the winding of the relay BFR causing its armature to fall to the position shown, disconnecting the battery BAT from the generator battery field winding BF. The battery field discharge resistor BR is then connected across the battery field BF by the bridging of the second pair of contacts from the top of the relay BFR by an armature contact as these contacts are shown connected in series with the resistor BR by conductors 79, 81 and 83, conductor 79 being shown connected to the conductor 43 connected to one terminal of the field winding BF and the conductor 83 being shown connected to the positive control conductor PC which is also connected to the other terminal of the field winding BF. It will be evident that the voltage and current output of the generator will be reduced to a low value by the insertion of the discharge resistor SR in series with the generator shunt field winding and disconnection of the battery from the generator battery field winding BF. The connection of the discharge resistor BR across the generator battery field winding BF protects this winding from high values of induced voltage due to collapse of the field, and the discharge resistor SR inserted in the generator shunt field winding is of high resistance in order to reduce the field of this winding to a low value and likewise protect this winding against high values of induced voltage.

Closing of the upper pair of contacts of the relay PR takes place simultaneously upon opening of the lower contacts thereof which as has just been described, causes the generator output to be reduced to a low value. Upon closure of the upper contacts of the relay PR the winding of the relay VT is energized through these contacts and conductors 63 and 65, which are then connected to the positive control conductor PC. The relay VT is a time delay relay having a dashpot 67 shown connected to the armature thereof to retard upward movement thereof, and thereby delay the bridging of the fixed contacts by the armature contact until after the generator output is decreased to a low value, as has been described, and to then control transition between the series-parallel-shunt and parallel motor circuit by control of the series and parallel contactors S, P1 and P2 in the following sequence.

This delayed closure of the contacts of the time delay relay VT causes the winding of the parallel contactor P1 to be energized through the following connection comprising conductors PC, 51, through the closed contacts of relay VT, conductors 53, 55, closed lower contacts of the shunting relay MS1, conductor 57, closed lower contacts relay BFR and conductors 59 and 61. Upon energization of the winding of contactor P1 its armature is attracted and moves upward to the closed position. It will be noted that the central armature contact of the parallel contactor P1 is provided with flexible contact fingers so arranged that both of the central pair of fixed contacts will be bridged simultaneously upon initial upward movement of the armature from the normal position, as shown, until both the upper and lower pairs of fixed contacts are bridged, which then causes the lower central pair of fixed contacts to then be opened; closure of the upper central pair of fixed contacts established a holding circuit to the contactor winding comprising the closed contacts of the time delay relay VT and conductors 51, 53, 55 and 59, the latter being one of the conductors through which this winding was initially energized. Closure of the upper pair of contacts of the contactor P1 connects one pair of motors directly across the generator armature and opening of the lower central pair of contacts breaks the energizing circuit connection to the winding of the series contactor S and its armature drops to the position shown to bridge the lower fixed contacts thereof, to establish an energizing connection to the winding of the contactor P2 through conductors PC, 25, 72, 73 and 74. Energization of the winding of the contactor P2 causes the three upper pair of fixed contacts thereof to be bridged and the lower pair to be opened. Bridging of the upper pair of contacts connects the other pair of motors across the generator armature and therefore all the motors are then connected in parallel with the generator armature without opening of the power circuit as both contactors P1 and P2 are closed. It will be noted that upon the establishment of the parallel motor circuit connection that closure of the fixed contacts second from the top on the contactor P2 will cause the winding of the relay of SHR to again be energized through these contacts and the closed central contacts of the relay PR through the conductors PC, 75, 76, 77 and 27 and the contacts of the relay SHR will close and shunt out the discharge resistor SR and cause energization and closure of the contactor BFR which causes the generator battery field winding BF to again be energized in the manner previously described to again increase the voltage and current supplied to the motors when they are connected in parallel for the higher speed operating characteristics.

To obtain maximum speed characteristics of the motors the transition controller is moved to the parallel-shunt position PS' for energization of the shunting contactors MS1 and MS2 through the previously described circuit comprising the bridged contacts second from the bottom of the relay BFR and conductors 47 and 49.

When it becomes necessary to make a backward change in the motor connections from the parallel-shunt to the parallel circuit relation in order to prevent overloading of the engine and generator, the transition controller drum D' is moved back to the parallel position P' from the parallel shunt position PS'. Movement of the transition controller to the parallel position P' opens the previously described energizing circuit to the shunting contactors MS1 and MS2 and they open, to open the shunt connection of the individual resistors R with the respective motor series field windings, thereby increasing the C. E. M. F. and lowering the current supplied to the motors.

Transition backward from the parallel motor circuit relation to the series-parallel-shunt relation in order to further reduce the load on the engine and generator is accomplished by movement of the master controller MC to position f which removes the interlocking detent 9 from the slot 11 in the transition controller drum D' to permit movement of the drum D' from the parallel position P' to the series-parallel-shunt position SS' to accomplish backward transition. The sequence of operation of the various relays and contactors resulting from the above backward movement of the transition controller from the position P' to position SS' is as follows: When the transition controller is initially moved from the position P' toward position SS' the energizing circuit to the parallel relay PR is broken and its armature falls to the position shown and the upper and central fixed contacts are opened and the lower fixed contacts are closed. Opening of the central pair of contacts of the parallel relay PR breaks the energizing circuit to relay SHR comprising conductors 75, 76, 77 and 27 through the bridged contacts second from the top of the parallel relay P2 causing the armature of the relay SHR to drop to the position shown to insert the discharge resistor SR in the circuit of the generator shunt field SF and to open the energizing circuit of the relay BFR and its armature will fall to the position shown, causing deenergization of the generator battery field winding BF. With the armatures of both relays SHR and BFR in the position shown, as previously described, the voltage and output of the generator is again reduced to a low value. Opening of the upper contacts of the relay PR opens the previously described energizing connection to the winding of the time delay relay VT comprising conductors PC, 63 and 65 and its armature is restrained from moving downward by the dashpot 67 to open the holding circuit connection to the winding of the contactor P1 until the generator output has been reduced to a low value. When the armature of the time delay relay moves to the open position shown, the energizing holding circuit comprising conductors 51, 53, 55, 59 and 61 to the winding of the parallel contactor P1 is broken and it moves to the open position shown. Initial downward movement of the armature of the contactor P1 disconnects a pair of motors from the generator by the opening of the upper contacts and the flexible fingers of central armature contact bridge the lower central fixed contacts to cause energization of the winding of the series contactor S and its armature moves upward to open the lower pair of contacts to then open the holding energizing circuit to the winding of the contactor P2 through the closed contacts second from the bottom thereof, comprising conductors PC, 71, 73 and 74 as the circuit connection between the lower contacts of the series contactor S and the lower contacts of the contactor P1 comprising the conductors PC, 25, 72, and 73 is already opened by the opening of the lower contacts of the contactor P1. The armature of contactor P2 then falls to the position shown upon movement of the series contactor S to the upper position to reestablish the series-parallel motor connection. It will be noted that the above sequence of operation of the contactors S, P1 and P2 is such that the power circuit is not opened. When the armature of the contactor P2 falls to the position shown its lower contacts are bridged and the relay winding SHR is then energized to cause the contacts thereof to be bridged by upward movement of its armature shunting out the resistor SR and to energize the winding of the relay BFR and cause upward movement of its armature into simultaneous bridging relation with the upper contacts and also the contacts second from the bottom thereof. The bridging of the upper pair of contacts of the relay BFR causes energization of the generator battery field winding BF and the bridging of the contacts second from the bottom of the relay BFR reestablishes the energizing connnection to the motor field shunting contactors MS1 and MS2 through the central and upper contacts of the transition controller TC which are bridged by the movable contact when it is moved to the position SS'. It will be evident from the above described sequence of operation of the relays and contactors resulting from manual movement of the transition controller TC from the parallel position P' to position SS' that the power circuit will be kept closed and voltage and current output of the generator is reduced to a low value prior to opening of the parallel contactor P1 which causes the series contactor S to close and this causes the parallel contactor P2 to open which simultaneously causes reenergization of the windings of relays SHR and BFR and re-energizes the motor field shunting contactors MS1 and MS2 causing the generator field windings to be re-energized and the motor fields to be shunted to prevent arcing at the contacts of the contactors and to cause a smooth backward transition of the motor connections.

The backward change from the motor series-parallel-shunt connection to the motor series-parallel connection is accomplished by movement of the transition controller from position SS' to S' to deenergize the shunting contactors MS1 and MS2.

In order to open the series-parallel power circuit and generator excitation circuits the master controller is moved back to the idle position I to open the connection between the positive terminal of the battery and the positive control conductor PC.

It will be evident from the above description of my combined generating electric traction and control system that the object of the invention as previously stated is accomplished.

I claim:

1. A generating electric traction and control system of the type described comprising, a prime mover, an electric generator driven thereby, a plurality of electric traction motors, power connections interconnecting said generator and motors, said power connections including electrically operated switching means for causing transition of the connections of pairs of said motors between series and parallel circuit relation with said generator, means for reducing the generator excitation to reduce the power output therefrom to a low value, electrically operated means for reducing the excitation of said motors to increase the power input thereto and control means comprising a manually operable transition controller and time delay switching control means electrically interconnected to said motor connection transition switching means, said generator and said motor excitation reducing means in a manner so that sequential operation of said combination of interconnected means takes place to cause the motor excitation to be increased and the generator power output to be reduced prior to operation of the transition switching means thereby causing transition of the motor connections between series and parallel and to cause only the generator power output to be reduced prior to operation of said transition switching means upon transition between parallel and series motor connection.

2. A generating electric traction and control system for a vehicle comprising a prime mover, an electric generator driven thereby, a plurality of electric traction motors for driving the vehicle, power connections interconnecting said generator and motors, said power connections including switching means for causing transition of the motor connections with the generator to vary the speed and torque of the vehicle, means for reducing the generator excitation to reduce the power output thereof to a low value, means for reducing the excitation of the motors to increase the generator output to the motors to vary the speed and torque thereof, and control means comprising a manually operable transition controller and time delay switching means interconnected with said motor connection transition means, said generator and motor excitation reducing means in a manner so that sequential operation of said combination of interconnected means takes place to cause the motor excitation to be increased and generator power output to be reduced prior to transition of said motor connections from series to parallel by said switching means and said generator output to be decreased prior to and said motor excitation to be reduced subsequent to transition of said motor connections from parallel to series, and to prevent opening of said power connections between said generator and motors upon transition thereof.

3. A generating electric traction and control system of the type described comprising, a prime mover, electrically operated speed and output regulating means therefor, an electric generator driven by the prime mover, electrically operated generator excitation reducing means, a plurality of electric traction motors, electrically operated motor excitation reducing means, power connections interconnecting said generator and motors, said power connections including electrically operated switching means for connecting the motors in series-parallel or parallel circuit relation with the generator, interlocking, holding and control connections interconnecting all of said electrically operated means and including electrically operated control relays and manually operable controllers, at least one of said control relays having means for delaying operation thereof, said interlocking holding and control connections being arranged so said prime mover regulating means is controlled by one of said controllers which also controls said switching means to establish the series-parallel motor connection, and said generator excitation reducing means is controlled prior to operation of said switching means to cause transition of said motor connections by action of said control relays which are controlled by a second controller upon movement thereof between two control positions, movement of said second controller to a third control position serving to control operation of said motor excitation reducing means when said motors are connected in series-parallel relation.

4. A generating electric traction and control system of the type described comprising, a prime mover having speed and output regulating means, an electrical generator driven by the prime mover, means for reducing the excitation of said generator to a low value, a plurality of electric motors, means for reducing the excitation of said motors, power connections between the generator and motors, said power connections including switching means for connecting the motors in series-parallel or parallel with the generator; a plurality of electrical operating means for operating said prime mover regulating means, said generator and said motor excitation reducing means and said switching means, control and interlocking connections interconnecting said electrical operating means, a plurality of control relays, time delay means for one of said control relays, a plurality of manually operable controllers connected to said relays and said interlocking and control connectors for controlling operation of said electrical means separately or in combination and sequence, one of said controllers being movable to a plurality of positions to cause establishment of the series-parallel motor connection and to control the speed and output of the prime mover, a second controller movable between two positions to control said control relays thereby to cause operation of said generator excitation reducing means prior to operation of said switching means in order to cause closed circuit transition of the motor connections, said second controller being movable to a third position for controlling operation of said motor excitation reducing means only when the motors are connected in series-parallel, said second controller also being movable to a fourth position for controlling operation of said motor excitation reducing means only when the motors are connected in parallel.

5. A generating electric traction and control system of the type described comprising, an engine, speed and output regulating means therefor, an electric generator, means for reducing the output of the generator to a low value, a plurality of electric traction motors, a power circuit between the generator and motors, means for reducing the motor excitation, switching means in said power circuit for connecting pairs of motors in series or parallel circuit relation, electrical means for actuating said engine output regulating means, said generator output regulating means, said motor excitation reducing means and said switching means, control means electrically interconnected with said electrical actuating means comprising control relays, time delay means for one of said relays, a master controller movable to a plurality of positions for controlling electrical means to establish the series motor circuit relation and to vary the output of the prime mover, a transition controller movable between two positions to control said control relays in order to cause operation of said generator output reducing means prior to operation of said switching means and sequential operation of said switching means to prevent open circuit transition of said motor connections, said transition controller being movable to a third position for operation of said motor excitation reducing means only when the motors are in series circuit relation, movement of said transition controller to a fourth position controlling operation of said motor excitation reducing means when the motors are connected in parallel position and mechanical interlocking means between said controllers to prevent operation of said transition controller to cause transition of said motor connections when said master controller is moved to positions causing operation of the engine at high values of output.

6. A generating electric traction and control system for a vehicle comprising a prime mover, an electric generator driven thereby, a plurality of electric traction motors for driving the vehicle, power connections interconnecting said generator and motors, said power connections including switching means for causing transition of the motor connections with the generator to vary the speed and torque of the vehicle, means for reducing the generator excitation to reduce the power output thereof to a low value, means for reducing the excitation of the motors to increase the generator output to the motors to vary the speed and torque thereof, and control means comprising a manually operable transition controller and time delay switching means interconnected with said motor connection transition means, said generator and motor excitation reducing means in a manner so that prior to forward transition of the motor connections, that is, from series to parallel, the motor excitation is increased before the generator output is reduced and so that the generator output is increased subsequent to forward transition and so that prior to backward transition, that is, from parallel to series, the generator excitation is reduced and subsequent to backward transition the generator excitation is increased before the motor excitation is reduced.

TORSTEN O. LILLQUIST.